US009774066B2

(12) United States Patent
Kisdarjono et al.

(10) Patent No.: US 9,774,066 B2
(45) Date of Patent: Sep. 26, 2017

(54) LARGE-SCALE METAL-AIR BATTERY WITH SLURRY ANODE

(71) Applicant: Sharp Laboratories of America (SLA), Inc., Camas, WA (US)

(72) Inventors: Hidayat Kisdarjono, Vancouver, WA (US); Yuhao Lu, Vancouver, WA (US); David Evans, Beaverton, OR (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 199 days.

(21) Appl. No.: 14/673,559

(22) Filed: Mar. 30, 2015

(65) Prior Publication Data

US 2015/0207191 A1    Jul. 23, 2015

Related U.S. Application Data

(63) Continuation-in-part of application No. 14/473,713, filed on Aug. 29, 2014, now Pat. No. 9,608,264, (Continued)

(51) Int. Cl.
*H01M 12/08* (2006.01)
*H01M 4/38* (2006.01)
(Continued)

(52) U.S. Cl.
CPC ............. *H01M 12/08* (2013.01); *H01M 4/38* (2013.01); *H01M 4/76* (2013.01); *H01M 6/045* (2013.01);
(Continued)

(58) Field of Classification Search
None
See application file for complete search history.

(56) References Cited

U.S. PATENT DOCUMENTS

| 5,206,096 A | 4/1993 | Goldstein et al. |
| 5,318,861 A * | 6/1994 | Harats ................. B60L 11/1879 429/142 |

(Continued)

OTHER PUBLICATIONS

F. R. McLarnon, "The Secondary Alkaline Zinc Electrode," Journal of The Electrochemical Society, vol. 138, No. 2, p. 645, 1991.
(Continued)

*Primary Examiner* — Patrick Ryan
*Assistant Examiner* — Haixia Zhang
(74) *Attorney, Agent, or Firm* — Law Office of Gerald Maliszewski; Gerald Maliszewski

(57) ABSTRACT

A battery and an associated method are provided for generating power using an air cathode battery with a slurry anode. The method provides a battery with an air cathode separated from an anode current collector by an electrically insulating separator and an extrusion gap. The anode current collector extruder has a first plate with a plurality of slurry outlet perforations, and a sleeve having a first partition immediately adjacent to the extruder first plate, with a plurality of slurry inlet perforations. Active slurry is provided under pressure to an extruder inlet, and the extruder first plate slurry outlet perforations are selectively aligned with sleeve first partition slurry inlet perforations. Active slurry deposits are formed in the extrusion gap to mechanically charge the battery. In the discharge position, the sleeve moves so that the perforations no longer align, and slurry in the extruder is isolated from slurry in the extrusion gap.

10 Claims, 8 Drawing Sheets

Related U.S. Application Data which is a continuation-in-part of application No. 14/042,264, filed on Sep. 30, 2013, now abandoned, which is a continuation-in-part of application No. 13/564,015, filed on Aug. 1, 2012, now Pat. No. 9,537,192.

(51) Int. Cl.
| | |
|---|---|
| *H01M 4/76* | (2006.01) |
| *H01M 6/04* | (2006.01) |
| *H01M 6/50* | (2006.01) |
| *H01M 12/06* | (2006.01) |
| *H01M 8/083* | (2016.01) |

(52) U.S. Cl.
CPC ......... *H01M 6/5077* (2013.01); *H01M 12/06* (2013.01); *H01M 8/083* (2013.01)

(56) References Cited

U.S. PATENT DOCUMENTS

| | | | |
|---|---|---|---|
| 2005/0255339 A1* | 11/2005 | Tsai | H01M 2/36 429/406 |
| 2011/0189520 A1* | 8/2011 | Carter | B60L 11/1879 429/107 |
| 2012/0021303 A1 | 1/2012 | Amendola et al. | |
| 2013/0113431 A1 | 5/2013 | Banerjee et al. | |
| 2013/0285597 A1* | 10/2013 | Goldstein | H02J 7/0052 320/107 |
| 2014/0370401 A1* | 12/2014 | Kisdarjono | H01M 4/38 429/406 |

OTHER PUBLICATIONS

C. Cachet, "The Behavior of Zinc Electrode in Alkaline Electrolytes," Journal of The Electrochemical Society, vol. 139, No. 3, p. 644, 1992.

G. Bronoel, A. Millot, and N. Tassin, "Development of Ni–Zn cells," Journal of Power Sources, vol. 34, No. 3, pp. 243-255, Apr. 1991.

\* cited by examiner

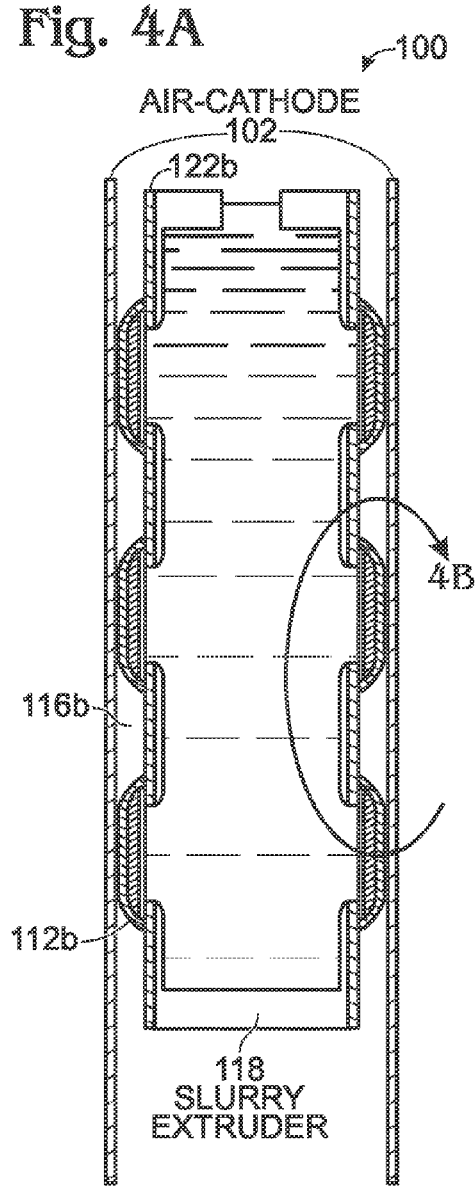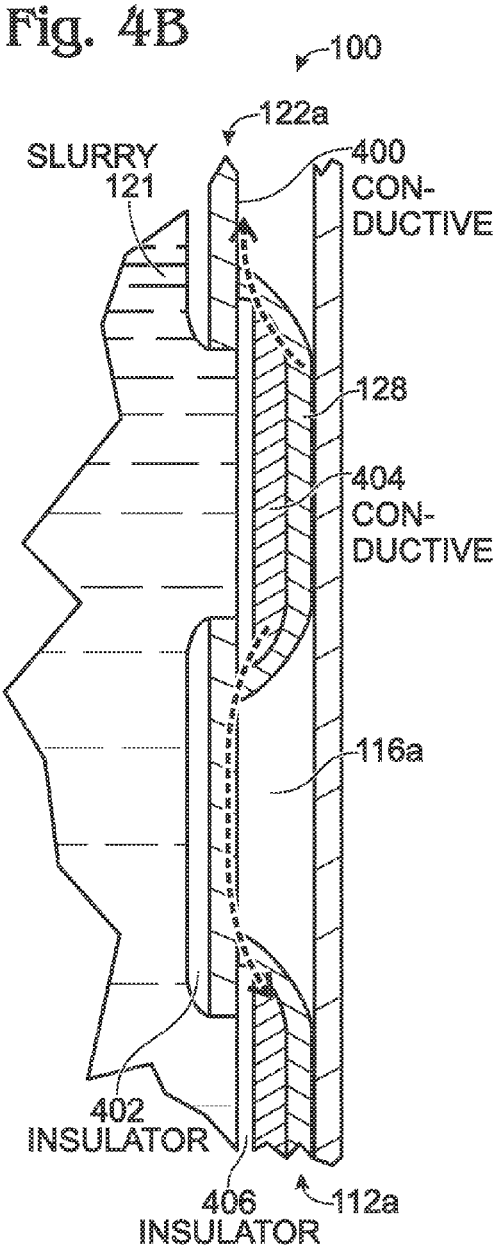

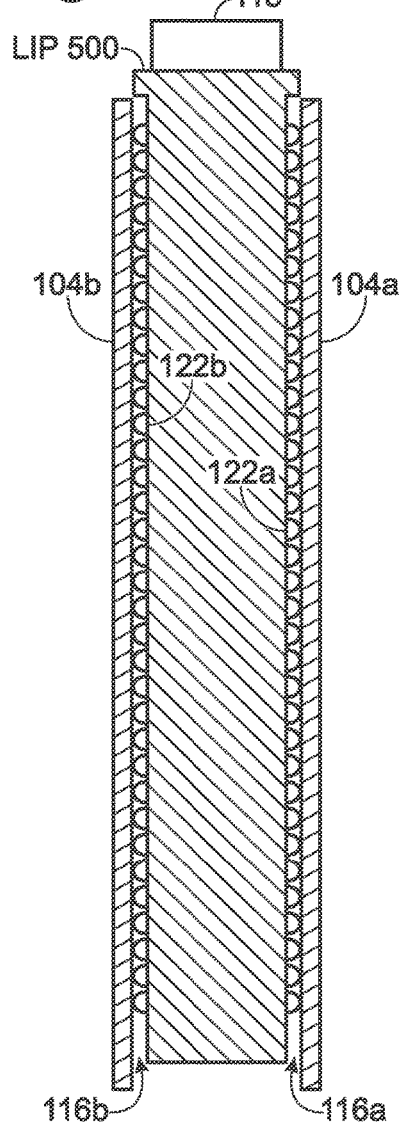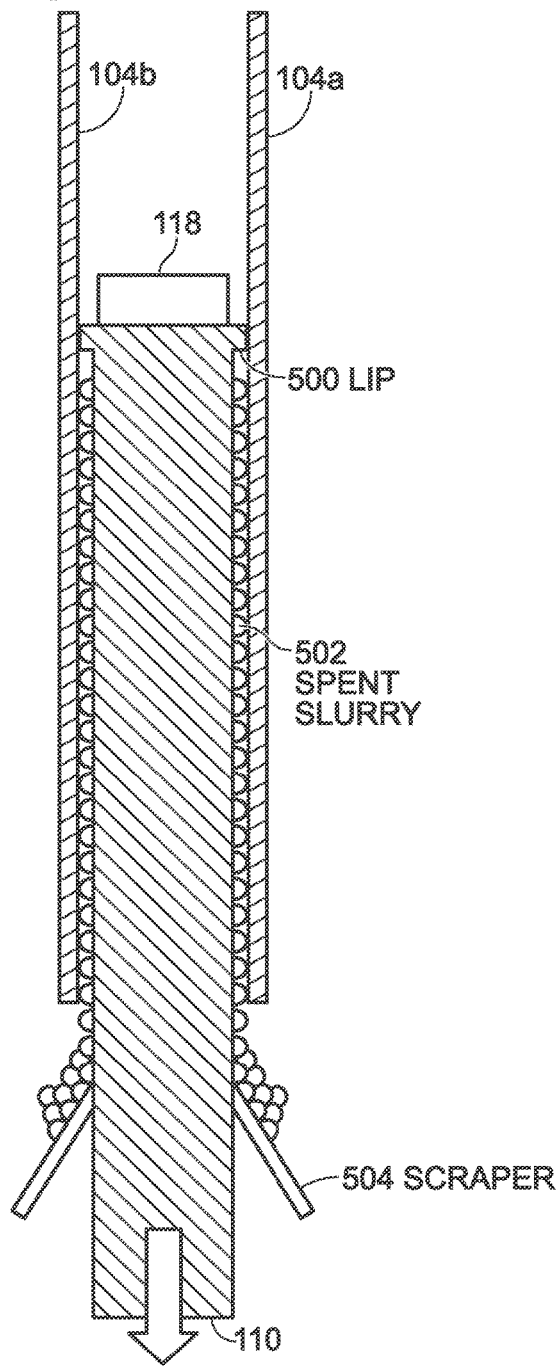

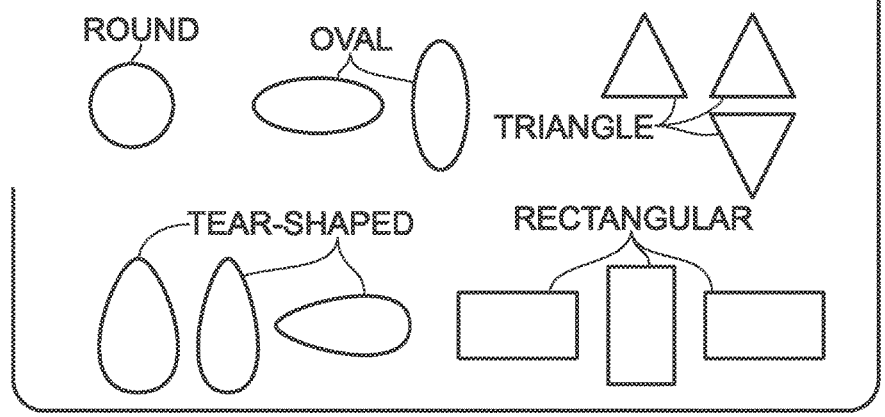
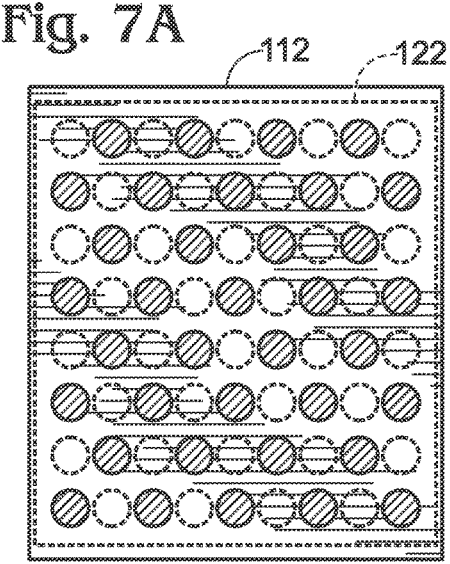 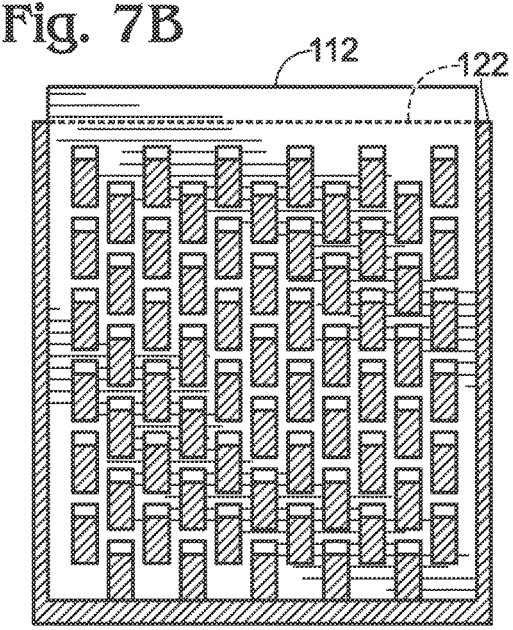

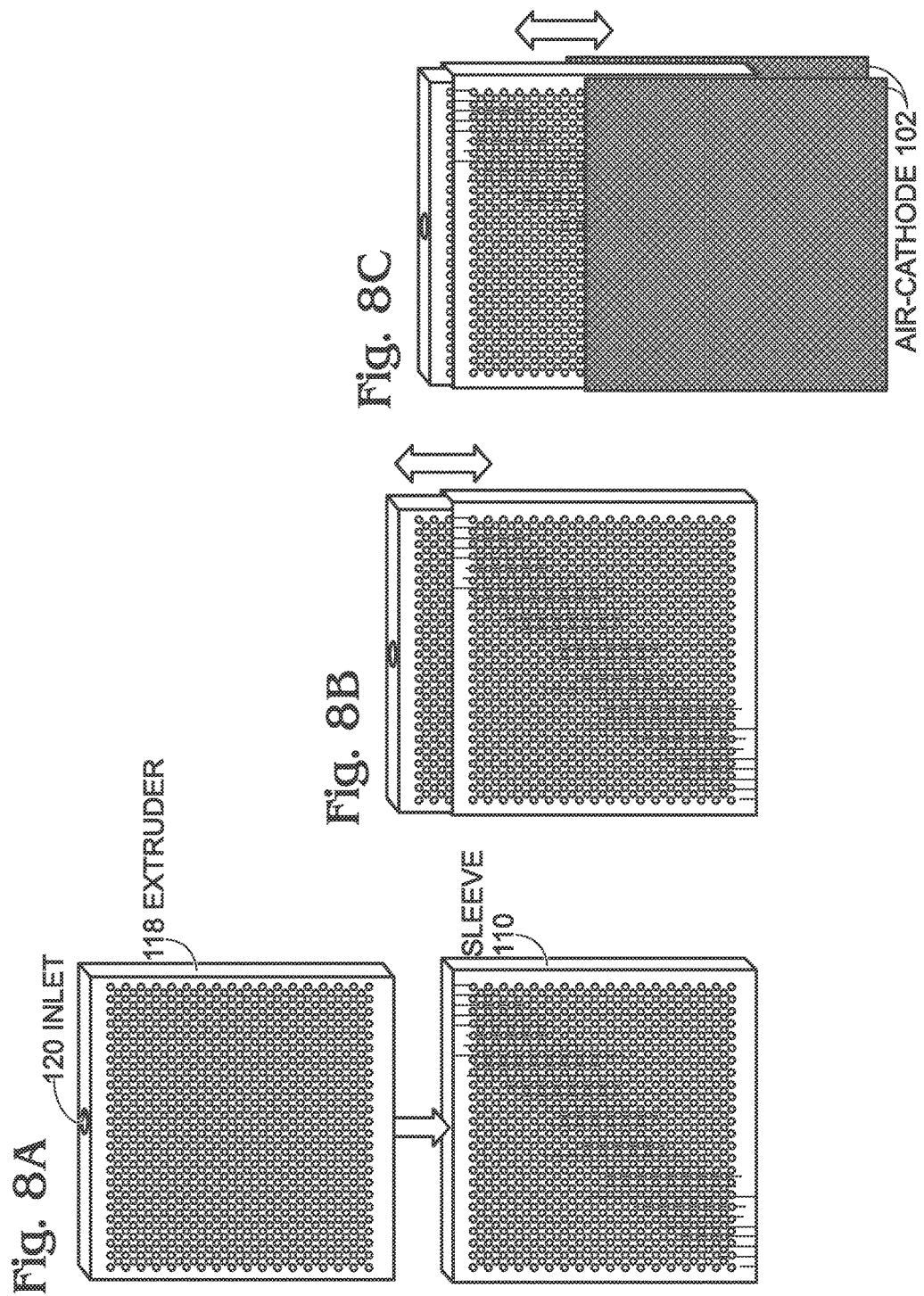

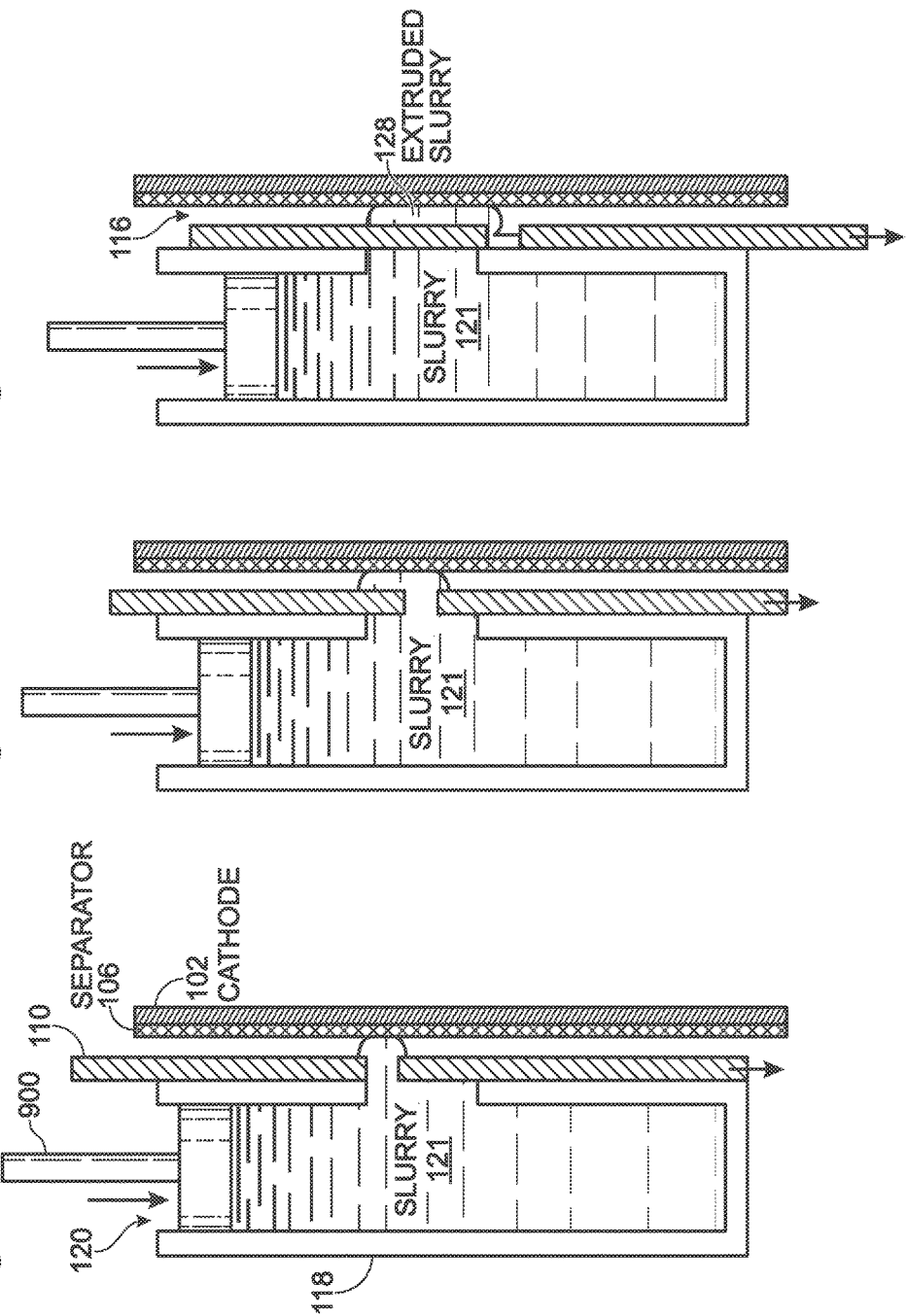

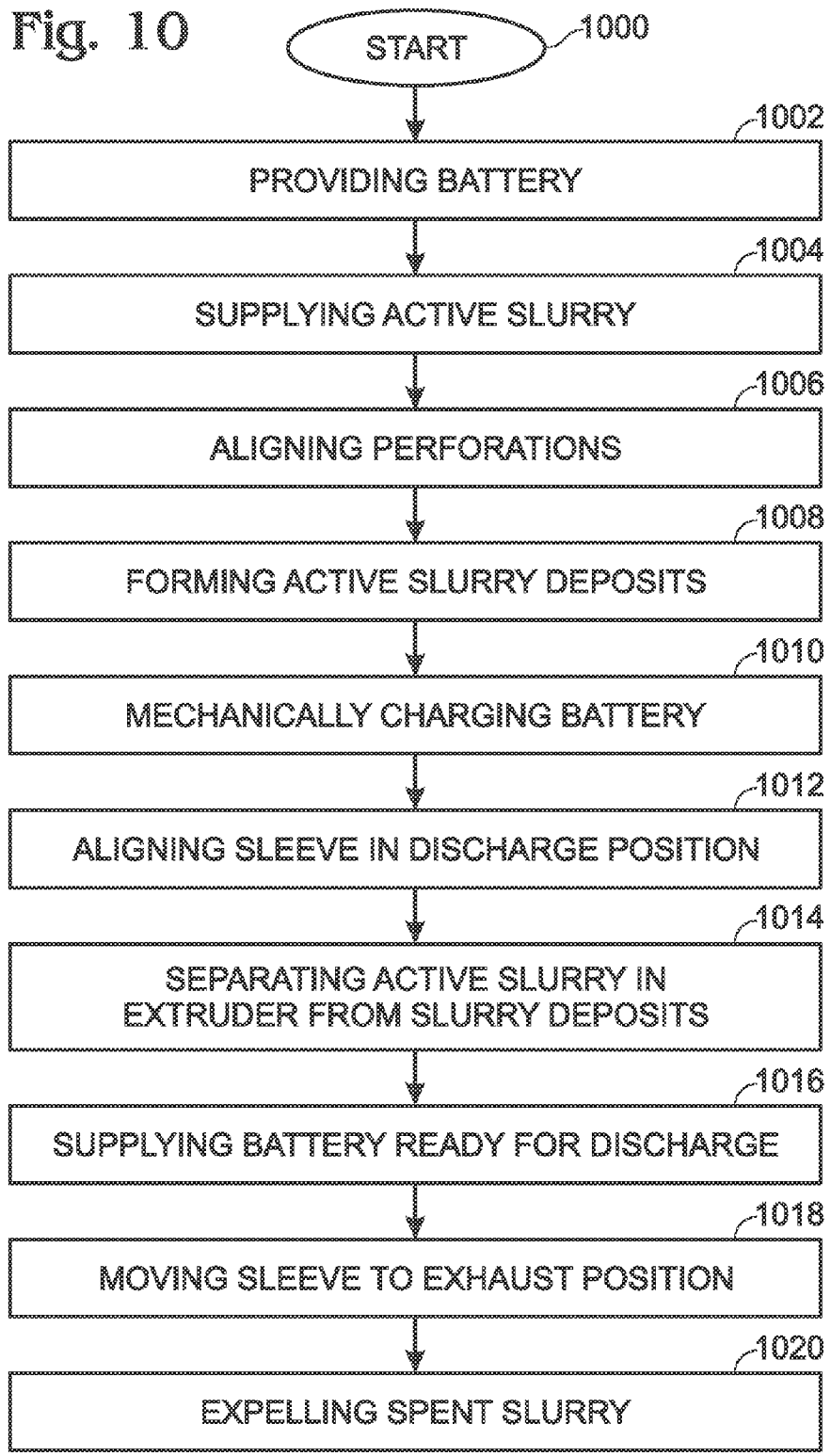

LARGE-SCALE METAL-AIR BATTERY WITH SLURRY ANODE

RELATED APPLICATION

The application is a Continuation-in-Part of a pending application entitled, AIR CATHODE BATTERY USING ZINC SLURRY ANODE WITH CARBON ADDITIVES, invented by Hidayat Kisdarjono et al., Ser. No. 14/473,713, filed on Aug. 29, 2014;

which is a Continuation-in-Part of a pending application entitled, FLOW-THROUGH METAL BATTERY WITH ION EXCHANGE MEMBRANE, invented by Yuhao Lu et al., Ser. No. 14/042,264, filed on Sep. 30, 2013;

which is a Continuation-in-Part of a pending application entitled, BATTERY WITH LOW TEMPERATURE MOLTEN SALT (LTMS) CATHODE, invented by Yuhao Lu et al., Ser. No. 13/564,015, filed on Aug. 1, 2012. Both these applications are incorporated herein by reference.

BACKGROUND OF THE INVENTION

1. Field of the Invention

This invention generally relates to electrochemical cells and, more particularly, to a flow-through air cathode battery using a zinc slurry extruding anode.

2. Description of the Related Art

Flow-through batteries have been intensively studied and developed for large-scale energy storage due to their long cycle life, flexible design, and high reliability. A battery is an electrochemical device in which ions (e.g. metal-ions, hydroxyl-ions, protons, etc.) commute between the anode and cathode to realize energy storage and conversion. In a conventional battery, all the components including anode materials, cathode materials, separator, electrolyte, and current collectors are packed into a volume-fixed container. Its energy and capacity of are unchangeable as long as the battery is assembled. A flow-through battery consists of current collectors (electrodes) separated by an ion exchange membrane, while its anode and cathode materials are stored in separate storage tanks. The anode and cathode materials are circulated through the flow-through battery in which electrochemical reactions take place to deliver and to store energy. Therefore, the battery capacity and energy are determined by (1) electrode materials (anolyte and catholyte), (2) the concentrations of anolyte and catholyte, and (3) the volumes of anolyte and catholyte storage tanks.

An air battery may be considered to be a flow-through cathode battery where oxygen in the air is continuously passed over a reactive metal electrode to act as a cathode. An electrolyte typically separates the cathode from a metal or a metal compound anode. Zinc is a favored material, and it may be in a solid phase or in a particle form to enable a flow-through anode. Conventional batteries using a flow-through zinc particle anode suffer from the large amounts of electrolyte required to avoid passivation around zinc particles. Further, the zinc particle anode requires continuous pumping, and the viscosity needed to support pumping results in a low zinc concentration.

One example of a mechanically rechargeable metal-air battery using a slurry anode that addresses the above-mentioned problems is provided in parent application Ser. No. 14/473,713. On the one hand, the slurry needs to have minimal electronic resistivity so a high loading of conducting solids, i.e. active metal and carbon, is necessary. However, the high loading of solids increases slurry viscosity, so the efficient filling and removal of slurry requires the battery to have either (a) a large gap between anode-cathode current collectors, or (b) a small active area. Using an exemplary version of this mechanically rechargeable zinc-air battery, an active area of 16 square centimeters ($cm^2$) and gap of 3-5 millimeters (mm) is obtained. However, a relatively high pressure is required to fill the slurry cavity. Also, the battery $R_{Int}$ (primarily slurry resistance) limits power to 100 milliamperes per square cm ($mA/cm^2$). To scale up the power output, the battery active area would need to increase by an order of magnitude, and a novel way of delivering slurry would be needed.

It would be advantageous if a flow-through zinc anode battery existed with a large active area, with an effective way of replenishing spent slurry with active slurry.

SUMMARY OF THE INVENTION

Disclosed herein is metal-air cathode battery enabled with a sliding anode/extruder suitable for large scale application. The slurry extruder has the capability of filling a narrow gap (e.g., 0.2 to 3 mm) between the anode and cathode current collector, thus lowering the primary slurry resistance ($R_{Int}$) and increasing the power density. The active area filled with slurry is large (e.g., 20 cm×20 cm), increasing the cell's power output. The active slurry is deposited in a space that permits for expansion during the discharge process, which maximizes utilization. The sliding anode is also used as a plunger for removing spent slurry.

Accordingly, a method is provided for generating power using an air cathode battery with a slurry anode. The method provides a battery with an air cathode separated from an anode current collector by an electrically insulating separator and an extrusion gap. The anode current collector extruder has a first plate with a plurality of slurry outlet perforations, and a sleeve having a first partition immediately adjacent to the extruder first plate, with a plurality of slurry inlet perforations. Active slurry is provided under pressure to an extruder inlet, and the extruder first plate slurry outlet perforations are selectively aligned with sleeve first partition slurry inlet perforations. As a result, a plurality of active slurry deposits are formed in the extrusion gap to mechanically charge the battery.

In one aspect, the air cathode is formed from a pair of parallelly aligned panels having a first panel, separated from first partition by a first separator and a first extrusion gap, and a second panel. The extruder forms a sealed chamber with a second plate, having a plurality of slurry outlet perforations, and the sleeve further includes a second partition immediately adjacent to the extruder second plate. The second partition has a plurality of slurry inlet perforations, separated from the air cathode second panel by a second extrusion gap and a second separator. As a result, the method forms active slurry deposits in the first and second extrusion gaps, respectively, between the perforations in the sleeve first and second partitions, and the first and second separators.

Subsequent to mechanically charging the battery, the extruder is aligned in a discharge position, where no perforations in the first and second plates are aligned with perforations in the current collector first and second partitions. In response to the discharge position, the active slurry in the extruder sealed chamber is isolated from the active slurry deposits in first and second extrusion gaps, and the battery is ready for discharging.

More explicitly, the extruder first and second plates have electrically conductive exterior surfaces respectively facing the current collector first and second partitions, and electrically insulated interior surfaces. The sleeve first and second partitions have conductive exterior surfaces respectively facing the first and second extrusion gaps, and electrically insulated interior surfaces. With this configuration, the combination of the extruder first and second plate exterior surfaces, the sleeve first and second partition exterior surfaces, and the active slurry deposits in the first and second extrusion gaps respectively form first and second electrically continuously anode electrodes when the extruder is in the discharge position.

In one aspect, the sleeve first and second partitions each have a lip extending from a top edge of their exterior surfaces to a top edge of first and second separator interior surfaces. When the sleeve is moved to an exhaust position, the lips are extended along the interior surfaces of the first and second separators, from the top edges to first and second separator bottom edges, and spent slurry is expelled from the first and second extrusion gaps.

Additional details of the above-described method and an air cathode battery with a slurry anode are provided below.

BRIEF DESCRIPTION OF THE DRAWINGS

FIG. 3 is a partial cross-section view of the battery of FIG. 2 with the extruder in the discharge position.

FIGS. 4A and 4B are partial cross-sectional views depicting additional details of the air cathode battery in the discharge position.

FIGS. 5A and 5B are partial cross-section views depicting the air cathode battery engaged in the exhaust position.

FIG. 6 is a diagram depicting exemplary perforation shapes.

FIGS. 7A and 7B depict exemplary perforation patterns on a current collector sleeve.

FIG. 8A through 8C depict an extruder, current collector sleeve, and air cathode.

FIGS. 9A through 9C depict the process of forming active slurry deposits.

FIG. 10 is a flowchart illustrating a method for generating power using an air cathode battery with a slurry anode.

DETAILED DESCRIPTION

Figure 1:
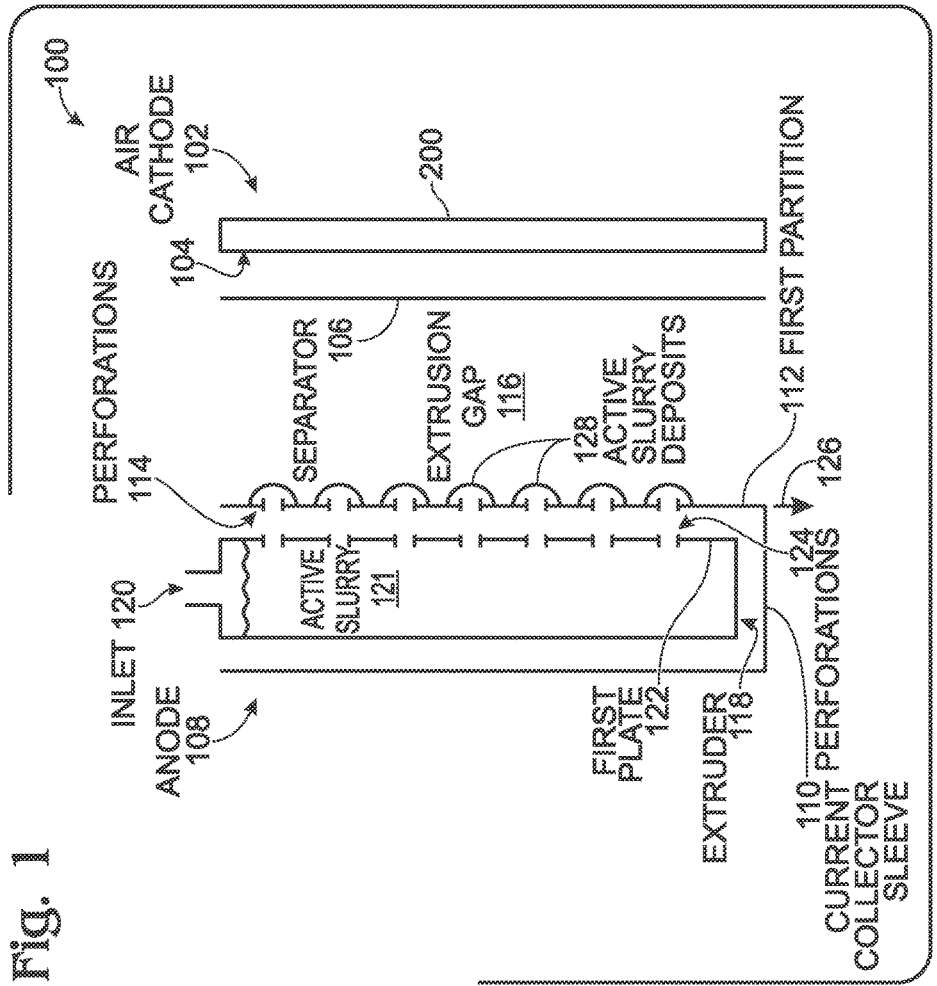
FIG. 1 is a partial cross-sectional view of an air cathode battery with a slurry anode.

FIG. 1 is a partial cross-sectional view of an air cathode battery with a slurry anode. The battery 100 comprises an air cathode 102 having an interior surface 104. An electrically insulating separator 106 is adjacent to the air cathode interior surface 104. In one aspect, the separator 106 performs two functions. It acts as an electrical insulator so that the anode does not short to the cathode. Typically, the separator has relatively large pores and is permeable to electrolyte. In addition, depending on design, the separator may incorporate an ion exchange membrane, such as a polymer, to selectively pass ions through relatively small pores. In the case of a zinc slurry for example, such an ion exchange membrane may stop $Zn(OH)^{4-}$ or zincate ion from migrating to the cathode. In one aspect the air cathode is integrated with the ion exchange membrane, and is called a membrane-electrode assembly (MEA).

As would be well known in the art, and therefore not shown, the air cathode 102 comprises a catalyst layer and gas diffusion layer (GDL). The catalyst agent may be platinum particles, embedded in electrically conducting layer of carbon. The GDL may comprise a layer of carbon and platinum particles with some hydrophobic agent such as Teflon™. The GDL allows air in from outside, but keeps water and electrolyte from seeping out, to prevent drying. Typically, the current collector is a highly conductive metal or metal-coated carbon material.

An anode 108 comprises a current collector sleeve 110 with a first partition 112. The first partition 112 has a plurality of slurry inlet perforations 114, separated from the separator 106 by an extrusion gap 116. An extruder 118 comprises an inlet 120 to accept active slurry 121, and a first plate 122, with a plurality of slurry outlet perforations 124, immediately adjacent to the current collector first partition 112 (in the mechanical charging position).

In one aspect, the active slurry 121 comprises zinc particles and an alkaline electrolyte. Alternatively, instead or in addition to Zn, the particles may be magnesium (Mg), aluminum (Al), iron (Fe), copper (Cu), or combinations of these metal particles. The slurry 121 may additionally comprise carbon additives and a complexing agent in the alkaline electrolyte. Typically, the zinc particles have an average size (diameter) in the range of 1 micron to 500 microns. The carbon additives may be graphite, carbon fiber, carbon black, or carbon nanoparticles. However, other forms of carbon may also be suitable. The alkaline electrolytes may, for example, be potassium hydroxide (KOH) or sodium hydroxide (NaOH). However, many other alkaline electrolytes are known that could also be suitable. The complexing agent may be ethylene diamine tetra acetic acid (EDTA), citric acid, or ammonium hydroxide. However, this is not an exhaustive list and other complexing agents would be known by those with skill in the art.

In a charged state, the zinc slurry (i.e. active zinc slurry) has an electrical resistance of less than 10 ohms and a zinc molar concentration of greater than 15 moles per liter (mol/L). As used herein, a "charged (or ready for discharge) state" is defined as a battery active material not having undergone spontaneous redox reactions that drive electrons (through an external circuit, e.g. load) from the anode to the cathode—thus generating power. A "discharged state" is defined herein as the condition where the spontaneous reaction that generated power has ceased because the anode materials have been oxidized and the cathode materials have been reduced. Active or fresh Zn slurry refers to the zinc with a neutral charge or in metallic form. Spent Zn slurry refers to zinc that has been oxidized and converted to ZnO. The Zn in ZnO is an ion with a 2+ charge, having lost 2 electrons to the O atom. The spent slurry has larger volume because ZnO is less dense than Zn.

The current collector sleeve 110 is moveable, as indicated by reference designator 126, with respect to the extruder 118 and air cathode 102. A plurality of active slurry deposits 128 are formed in the extrusion gap 116 between the perforations 114 in the current collector first partition 112 and the separator 106 in response to selectively aligning perforations in the current collector first partition with perforations 124 in the extruder first plate 122. Note: the elements and the spacings in the drawing are not to scale in the interest of clarity.

Figure 2:
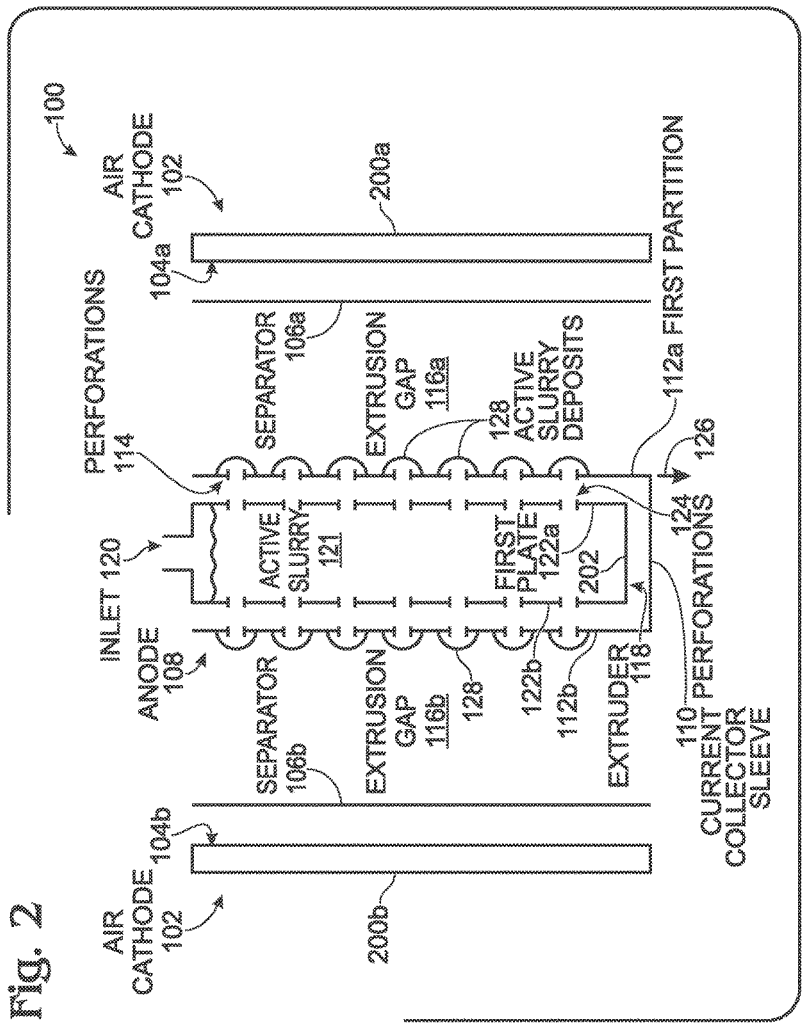
FIG. 2 is a partial cross-sectional view of a multi-panel air cathode battery.

FIG. 2 is a partial cross-sectional view of a multi-panel air cathode battery. The battery 100 includes all the features described above in the explanation of FIG. 1. However, in this aspect, the air cathode 102 is a pair of parallelly aligned panels comprising a first panel 200a having an interior surface 104a adjacent a first separator 106a, and a second panel 200b having an interior surface 104b adjacent a second separator 106b. The first separator 106a is separated from the current collector sleeve first partition 112a by a first extrusion gap 116a. The current collector sleeve further comprises a second partition 112b, with a plurality of slurry inlet perforations 114, separated from the second separator 106b by a second extrusion gap 116b.

The extruder 118 forms a sealed chamber with a second plate 122b having a plurality of slurry outlet perforations 124, immediately adjacent to the current collector sleeve second partition 112b, and with at least a bottom surface 202 connecting the first plate 122a to the second plate. In the case of a two-panel air cathode battery, the current collector sleeve would typically have sides (not shown) to complete the sealed chamber. As shown, the battery extruder 118 is in the mechanical charge position, where active slurry is permitted to flow from the extruder, through the current collector sleeve, into the extrusion gaps.

FIG. 3 is a partial cross-section view of the battery of FIG. 2 with the extruder in the discharge position. The extruder 118, when in the discharge position, has no perforations 124 in the first and second plates 122a/122b that are aligned, respectively, with perforations 114 in the current collector sleeve first and second partitions 112a/112b. The active slurry 121 in the extruder sealed chamber is separated from the active slurry deposits 128 in first and second extrusion gaps 116a/116b when the extruder 118 is in the discharge position. Of course, it should be understood that the battery is not actually discharged unless a load is connected between the cathode and anode. Therefore, the shown position might more accurately be termed a "ready to be discharged" position.

FIGS. 4A and 4B are partial cross-sectional views depicting additional details of the air cathode battery in the discharge position. The extruder first plate 122a and second plate 122b have electrically conductive exterior surfaces 400 respectively facing the current collector sleeve first and second partitions 112a/112b. The extruder first and second plates 122a/122b have electrically insulated interior surfaces 402. The current collector sleeve first and second partitions 112a/112b have conductive exterior surfaces 404 respectively facing the first and second extrusion gaps 116a/116b. The current collector sleeve first and second partitions 112a/112b have electrically insulated interior surfaces 406.

As a result, the combination of the extruder first and second plate exterior surfaces 400, current collector sleeve first and second partition exterior surfaces 404, and active slurry deposits 128 in the first and second extrusion gaps 116a/116b respectively form first and second electrically continuously anode electrodes when the extruder 118 is in the discharge position. Further, the combination of the extruder first and second plate insulating interior surfaces 402, and the current collector sleeve first and second partition insulating interior surfaces 406, insulate slurry 121 inside the extruder 118 (sealed chamber) from being oxidized when the extruder is in the discharge position.

FIGS. 5A and 5B are partial cross-section views depicting the air cathode battery engaged in the exhaust position. The current collector sleeve first and second partitions 122a/122b each have a lip 500 extending from a top edge of their exterior surfaces respectively extending to the top edge of the first and second separators 104a/104b. The current collector sleeve first and second partitions 122a/122b are moveable with respect to the first and second separators 104a/104b to an exhaust position where the lips 500 are extended along interior surfaces of the first and second separator 104a/104b top edges to first and second separator bottom edges, respectively cleaning spent slurry deposits 502 from the first and second extrusion gaps 116a/116b.

FIG. 6 is a diagram depicting exemplary perforation shapes. The current collector sleeve first and second partition perforations and the extruder first and second plate perforations may have shapes that are round, oval, rectangular, tear-shaped, triangular, or combinations of the above-listed shapes.

FIGS. 7A and 7B depict exemplary perforation patterns on a current collector sleeve. FIG. 7A shows a simple perforation pattern with circular holes. Here the extruder/sleeve is in "closed" (ready for discharge) position. With such pattern, the area covered by extruded slurry is only about 25%. FIG. 7B shows an alternative perforation pattern in the open (mechanically charging) position that allows slurry coverage of about 75%.

The active slurry deposits that are formed on the current collector sleeve have a shape and volume that are responsive to the degree of overlap between perforations in the current collector sleeve first partition with perforations in the extruder first plate, which is at least partly a function of the current collector sleeve and extruder perforation shapes, the size of the shapes, and the alignment of intersecting perforations. Further, the active slurry deposits are formed in shapes that are responsive to the pressure of the active slurry supplied to the extruder inlet when the current collector sleeve first partition perforations and the extruder first plate perforations are aligned.

FIG. 8A through 8C depict an extruder, current collector sleeve, and air cathode. The slurry extruder 118 is formed as a rectangular-shaped sealed chamber with perforations in its two largest sides. The extruder 118 also has an inlet 120 for filling with active slurry. The anode current collector is in the form of a sleeve 110, also with perforations on its two largest sides. The extruder 118 is inserted into sleeve 110 and the two can move with respect to the other. When the perforation holes align, slurry can be extruded as pressure is applied and active slurry deposits can be formed between the current collector sleeve 110 and air cathode 102.

FIGS. 9A through 9C depict the process of forming active slurry deposits. A plunger 900 creates a positive pressure on the active slurry 121 in the extruder 118, and the steps are as follows:

1) Slurry 121 is pumped into the inlet 120 and pressurized.
2) The anode sleeve 110 slides downward. When a hole in the sleeve is aligned with a hole in the extruder 118, slurry is extruded into extrusion gap 116 between sleeve (anode current collector) and air cathode.
3) As the sleeve continues the downward movement, more slurry is extruded.
4) Slurry is now between anode and cathode. The vertical width size of the slurry extrusion 128 is primarily determined by the hole in extruder, not the sleeve.

In summary, when the holes align and pressure is applied, slurry is pushed out of extruder to fill the gap between sleeve and air cathode. In one aspect, (i) hole in sleeve is smaller than the hole in the extruder, and (ii) the sleeve is kept in motion relative to extruder and air-cathode. The result is that slurry drop is the same size as the larger extruder hole, so area of anode current collector is maximized. This means that the electrical contact area and space between slurry drops can, to a certain degree, be independently determined to optimize power density and utilization.

To prevent oxidation of the slurry, the inside (interior) wall of the extruder is isolated (electrically) from the slurry when extruder/sleeve in closed position during discharge (or ready to discharge) step. This condition is achieved by, for example, coating the interior surfaces of the extruder by insulating layer (e.g. Teflon™), while making the extruder outside (exterior) wall conductive. Likewise, the inside (interior) wall of the sleeve is covered by an insulating layer while the outside (exterior) wall is conductive. If the above-mentioned walls are insulating on the inside but conductive on the outside, when extruder/sleeve is in the closed position (during discharge), the anode current collector area is maximized while fresh slurry inside the extruder is protected from oxidation, as shown in FIGS. 4A and 4B.

Returning briefly to FIGS. 5A and 5B, to remove spent slurry, the extruder 118 and sleeve 110 move downward and the lip 500 on the top of outer wall of sleeve (anode current collector) sweeps slurry along with it. Scrapers 504, which are stationary, remove slurry from sleeve exterior surface, and it falls into reservoir below (not shown).

The use of the above-described extruder and sleeve combination forms an integrated device for filling a very narrow extrusion gap with slurry, while providing a simple means of removing spent slurry. The hole pattern on extruder and sleeve can be optimized to minimize the spacing between active slurry deposits, and to maximize contact area between slurry and anode current collector. An insulating layer on the interior surfaces of extruder and sleeve, with a conductive layer on the exterior surface, insulates slurry in the extruder during discharge.

The effective surface area of slurry particles increases because zinc particles become smaller and the zinc oxide that forms is porous. This results in strong adhesion between particles. Second, water is trapped in the porous zinc oxide and becomes unavailable to serve as medium through which ions can move, thereby stopping the chemical reaction. The volume of the zinc oxide is up to 20% greater than the zinc particles prior to discharge. Such an expansion causes a zinc-only slurry to solidify upon discharge, making it very difficult to pump slurry through the system.

FIG. 10 is a flowchart illustrating a method for generating power using an air cathode battery with a slurry anode. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps and describes the battery of FIG. 1 through 9C. The method starts at Step 1000.

Step 1002 provides a battery with an air cathode separated from an anode current collector by an electrically insulating separator and an extrusion gap, see FIG. 1. The anode current collector comprises an extruder having a first plate with a plurality of slurry outlet perforations, and a sleeve having a first partition immediately adjacent to the extruder first plate (in the mechanically charging position), with a plurality of slurry inlet perforations. The sleeve and extruder perforations may have round, oval, rectangular, tear, triangular, or combinations of the above-listed perforation shapes. Step 1004 supplies an active slurry under pressure to an extruder inlet. Step 1006 selectively aligns the extruder first plate slurry outlet perforations with sleeve first partition slurry inlet perforations. Step 1008 forms a plurality of active slurry deposits in the extrusion gap. Step 1010 mechanically charges the battery.

In one aspect, Step 1002 provides the air cathode as a pair of parallelly aligned panels comprising a first panel, separated from first partition by a first separator and a first extrusion gap, and a second panel, see FIG. 2. In this aspect, the extruder further comprises a sealed chamber with a second plate, having a plurality of slurry outlet perforations. Likewise, the sleeve further comprises a second partition immediately adjacent to the extruder second plate, with a plurality of slurry inlet perforations, separated from the air cathode second panel by a second extrusion gap and a second separator. Then, forming the plurality of active slurry deposits in Step 1008 includes forming active slurry deposits in the first and second extrusion gaps respectively formed between the perforations in the sleeve first and second partitions, and the first and second separators.

In another aspect, subsequent to mechanically charging the battery in Step 1010, Step 1012 aligns the sleeve in a discharge position, where no perforations in the first and second plates are aligned with perforations in the sleeve first and second partitions. In response to the discharge position, Step 1014 separates the active slurry in the extruder sealed chamber from the active slurry deposits in first and second extrusion gaps. Step 1016 supplies the battery ready for discharging.

In one aspect, Step 1002 provides extruder first and second plates having electrically conductive exterior surfaces respectively facing the current collector first and second partitions, and electrically insulated interior surfaces. Likewise, the sleeve first and second partitions have conductive exterior surfaces respectively facing the first and second extrusion gaps, and electrically insulated interior surfaces. In this case, supplying the battery ready for discharging in Step 1010 includes the combination of the extruder first and second plate exterior surfaces, the sleeve first and second partition exterior surfaces, and the active slurry deposits in the first and second extrusion gaps respectively forming first and second electrically continuously anode electrodes when the extruder is in the discharge position.

In another aspect, Step 1002 provides sleeve first and second partitions each having a lip extending from a top edge of their exterior surfaces to a top edge of first and second separator interior surfaces. Then, subsequent to discharging the battery, Step 1018 moves the sleeve to an exhaust position where the lips are extended along the interior surfaces of the first and second separators, from the top edges to first and second separator bottom edges. Step 1020 expels spent slurry from the first and second extrusion gaps.

In one aspect, selectively aligning the extruder first plate slurry outlet perforations with the sleeve first partition slurry inlet perforations in Step 1006 includes aligning the degree of overlap between the inlet and outlet perforations. Then, forming the plurality of active slurry deposits in Step 1008 includes forming active slurry deposits in a shape (and amount) responsive to the degree of overlap between perforations in the first partition with perforations in the first plate. In a related aspect, Step 1008 forms active slurry deposits in a shape (and amount) responsive to the pressure of the active slurry supplied to the extruder inlet.

An air cathode slurry anode battery has been provided. Examples of materials and configurations have been presented to illustrate the invention. Although only single sided and two-sided extruder/sleeve/cathode structures have been explicitly disclosed, it should be understood that multi-sided and circular structures are also possible and the invention is not limited to merely these examples. Other variations and embodiments of the invention will occur to those skilled in the art.

We claim:

1. An air cathode battery with a slurry anode, the battery comprising:
an air cathode having an interior surface;
an electrically insulating separator adjacent to the air cathode interior surface;
an anode comprising:
a current collector sleeve comprising a first partition with a plurality of slurry inlet perforations, separated from the separator by an extrusion gap, and moveable with respect to the air cathode and an extruder;
the extruder comprising an inlet to accept active slurry, and a first plate with a plurality of slurry outlet perforations, immediately adjacent to the current collector first partition;
a plurality of active slurry deposits formed in the extrusion gap between the perforations in the current collector first partition and the separator in response to selectively aligning perforations in the current collector first partition with perforations in the extruder first plate;
wherein the air cathode is a pair of parallelly aligned panels comprising a first panel having an interior surface and a second panel having an interior surface, wherein the separator comprises a first separator adjacent to the first panel interior surface and a second separator adjacent to the second panel interior surface, and wherein the extrusion gap comprises a first extrusion gap and a second extrusion gap;
wherein the first separator is separated from the current collector sleeve first partition by the first extrusion gap;
wherein the current collector sleeve further comprises a second partition with a plurality of slurry inlet perforations, separated from the second separator by the second extrusion gap; and
wherein the extruder further comprises a sealed chamber with a second plate having a plurality of slurry outlet perforations, immediately adjacent to the current collector sleeve second partition, and at least a bottom surface connecting the first plate to the second plate.

2. The battery of claim 1 wherein the extruder in a discharge position has no perforations in the first and second plates aligned with perforations in the current collector sleeve first and second partitions; and
wherein active slurry in the extruder sealed chamber is separated from the active slurry deposits in first and second extrusion gaps when the extruder is in the discharge position.

3. The battery of claim 2 wherein the extruder first plate and second plate have electrically conductive exterior surfaces respectively facing the current collector sleeve first and second partitions, and wherein the extruder first and second plates have electrically insulated interior surfaces; and
wherein the current collector sleeve first and second partitions have conductive exterior surfaces respectively facing the first and second extrusion gaps, and wherein the current collector sleeve first and second partitions have electrically insulated interior surfaces.

4. The battery of claim 3 wherein the combination of the extruder first and second plate exterior surfaces, current collector sleeve first and second partition exterior surfaces, and active slurry deposits in the first and second extrusion gaps respectively form first and second electrically continuously anode electrodes when the extruder is in the discharge position.

5. The battery of claim 3 wherein the current collector sleeve first and second partitions each have a lip extending from a top edge of their exterior surfaces respectively extending to a top edge of the first and second separators; and
wherein the current collector sleeve first and second partitions are moveable with respect to the first and second separators to an exhaust position where the lips are extended along interior surfaces of the first and second separator top edges to first and second separator bottom edges, respectively cleaning spent slurry deposits from the first and second extrusion gaps.

6. The battery of claim 1 wherein the current collector sleeve first and second partition perforations and the extruder first and second plate perforations have shapes selected from a group consisting of round, oval, rectangular, tear-shaped, and combinations of the above-listed shapes.

7. The battery of claim 1 wherein the active slurry deposits are formed in shapes responsive to the degree of overlap between perforations in the current collector sleeve first partition with perforations in the extruder first plate.

8. The battery of claim 1 wherein the active slurry deposits are formed in shapes responsive to the pressure of the active slurry supplied to the extruder inlet when the current collector sleeve first partition perforations and the extruder first plate perforations are aligned.

9. The battery of claim 1 wherein the active slurry comprises zinc particles and an alkaline electrolyte.

10. The battery of claim 3 wherein the combination of the extruder first and second plate insulating interior surfaces, and the current collector sleeve first and second partition insulating interior surfaces, insulate slurry inside the extruder sealed chamber from being oxidized when the extruder is in the discharge position.

* * * * *